(12) United States Patent
Lopez (10) Patent No.: US 10,598,301 B2
(45) Date of Patent: Mar. 24, 2020

(54) SAFETY APPARATUS

(71) Applicant: Eddie Lopez, Miami, FL (US)

(72) Inventor: Eddie Lopez, Miami, FL (US)

( * ) Notice: Subject to any disclaimer, the term of this patent is extended or adjusted under 35 U.S.C. 154(b) by 57 days.

(21) Appl. No.: 15/943,149

(22) Filed: Apr. 2, 2018

(65) Prior Publication Data

US 2018/0283582 A1 Oct. 4, 2018

Related U.S. Application Data (60) Provisional application No. 62/480,066, filed on Mar. 31, 2017.

(51) Int. Cl.
| | | |
|---|---|---|
| *F16L 3/08* | (2006.01) | |
| *F16L 3/12* | (2006.01) | |
| *F16L 3/127* | (2006.01) | |
| *F16L 3/26* | (2006.01) | |
| *A62B 1/18* | (2006.01) | |
| *A62B 35/00* | (2006.01) | |

(52) U.S. Cl.
CPC .............. *F16L 3/1226* (2013.01); *A62B 1/18* (2013.01); *A62B 35/0068* (2013.01); *F16L 3/127* (2013.01); *F16L 3/26* (2013.01); *A62B 35/0043* (2013.01)

(58) Field of Classification Search
CPC .......... F16L 3/1226; F16L 3/127; A62B 1/18; A62B 35/0068; A62B 35/0043; F16M 13/02
USPC ................ 248/74.1, 68.1, 65, 49, 51, 220.1; 174/68.1, 65 R, 532
See application file for complete search history.

(56) References Cited

U.S. PATENT DOCUMENTS

| | | | |
|---|---|---|---|
| 9,046,193 B1 * | 6/2015 | Cook | F16L 3/015 |
| 9,445,875 B2 * | 9/2016 | Costargent | A61M 25/0111 |
| D822,615 S * | 7/2018 | Baldwin | D13/155 |

* cited by examiner

*Primary Examiner* — Todd M Epps
(74) *Attorney, Agent, or Firm* — Trueba & Suarez PLLC; Roberto M. Suárez; William R. Trueba, Jr.

(57) ABSTRACT

A safety apparatus for secure attachment to a support structure includes: an attach plate securely attached to the support structure; a cable guide with a channel along the length of the cable guide for constraining a cable; and an attachment for attaching the cable guide to the attach plate, the attachment preventing any lateral movement of the cable guide in relation to the attach plate.

15 Claims, 9 Drawing Sheets

Reference: Edge of building or structure

SAFETY APPARATUS

CROSS-REFERENCE TO RELATED APPLICATIONS

This application is a non-provisional application of, and claims priority to, U.S. Provisional Patent Application No. 62/480,066 entitled "Safety Apparatus" filed on Mar. 31, 2017, and incorporated by reference herein in its entirety.

FIELD OF THE INVENTION

The invention relates generally to the field of safety apparatus, and more particularly, to an apparatus configured to mitigate cable or rope fray in a building or construction environment.

BACKGROUND

It is known in the art to anchor a rope or cable to the roof of a building and then to run that cable down the side of the building. In this way, supplies, movable platforms, or workers themselves can access the exterior of a building or structure. This is commonly seen as employed by window washers, painters, or repairmen. The safety concern is that the rubbing of the rope or cable across the rough edge of the building wall will inevitably cause fraying. A frayed cable is an unsafe and dangerous cable.

It is known in the art for workers to simply throw a piece of carpet or similar material over the edge of the wall and then run the cable or rope over that. While this, ostensibly, helps with the problem of fraying, it increases the risk of another problem, mainly, the side to side motion of the cables. Furthermore, these "carpet solutions" are prone to slipping out of place. The carpets themselves are prone to wear through quickly due to the forces involved.

Some attempts to solve this problem have employed the use of expensive swing-arm mechanisms. These are typically permanently anchored to the building, are expensive, and unsightly.

There exists a need, therefore, for a safety apparatus that is configured to safely and securely guide cable over the edge of a building, and is secure, compact, and durable.

SUMMARY

Briefly, according to an embodiment of the present invention, a safety apparatus is configured to be permanently or removably attached to a building or other structure in a secure manner and further configured to accept a rope or cable, thereby constraining the rope or cable's lateral movement while providing a smooth channel or groove within which the rope or cable can travel or remain fixed.

BRIEF DESCRIPTION OF THE DRAWINGS

These and other features, aspects, and advantages of the present invention will become better understood with regard to the following description, appended claims, and accompanying drawings where:

DESCRIPTION

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

In this specification where a document, act, or item of knowledge is referred to or discussed, this reference or discussion is not an admission that the document, act, or item of knowledge or any combination thereof was at the priority date, publicly available, known to the public, part of common general knowledge, or otherwise constitutes prior art under the applicable statutory provision; or is known to be relevant to an attempt to solve any problem with which this specification is concerned.

In the Summary above, in the Description below, and in the accompanying drawings, reference is made to particular features of the invention. It is to be understood that the disclosure of the invention in this specification includes all possible combinations of such particular features. Features from one embodiment can be used with other embodiments. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, structures, steps, etc. are optionally present. For example, an article "comprising" (or "which comprises") components A, B, and C can consist of (i.e., contain only) components A, B, and C, or can contain not only components A, B, and C, but also one or more other components or structures.

The term "at least" followed by a number is used herein to denote the start of a range beginning with that number (which may be a range having an upper limit or no upper limit, depending on the variable being defined). For example, "at least 1" means 1 more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

The terms "rope," "cable," or their equivalents are used interchangeably and are intended to encompass other similar structures such as wiring, tubes, or hoses.

Before describing in detail embodiments that are in accordance with the present invention, it should be observed that some of the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

While the specification will conclude with claims defining the features of embodiments of the invention that are regarded as novel, it is believed that the invention will be better understood from a consideration of the following description in conjunction with the figures, in which like reference numerals are carried forward.

Figure 1:
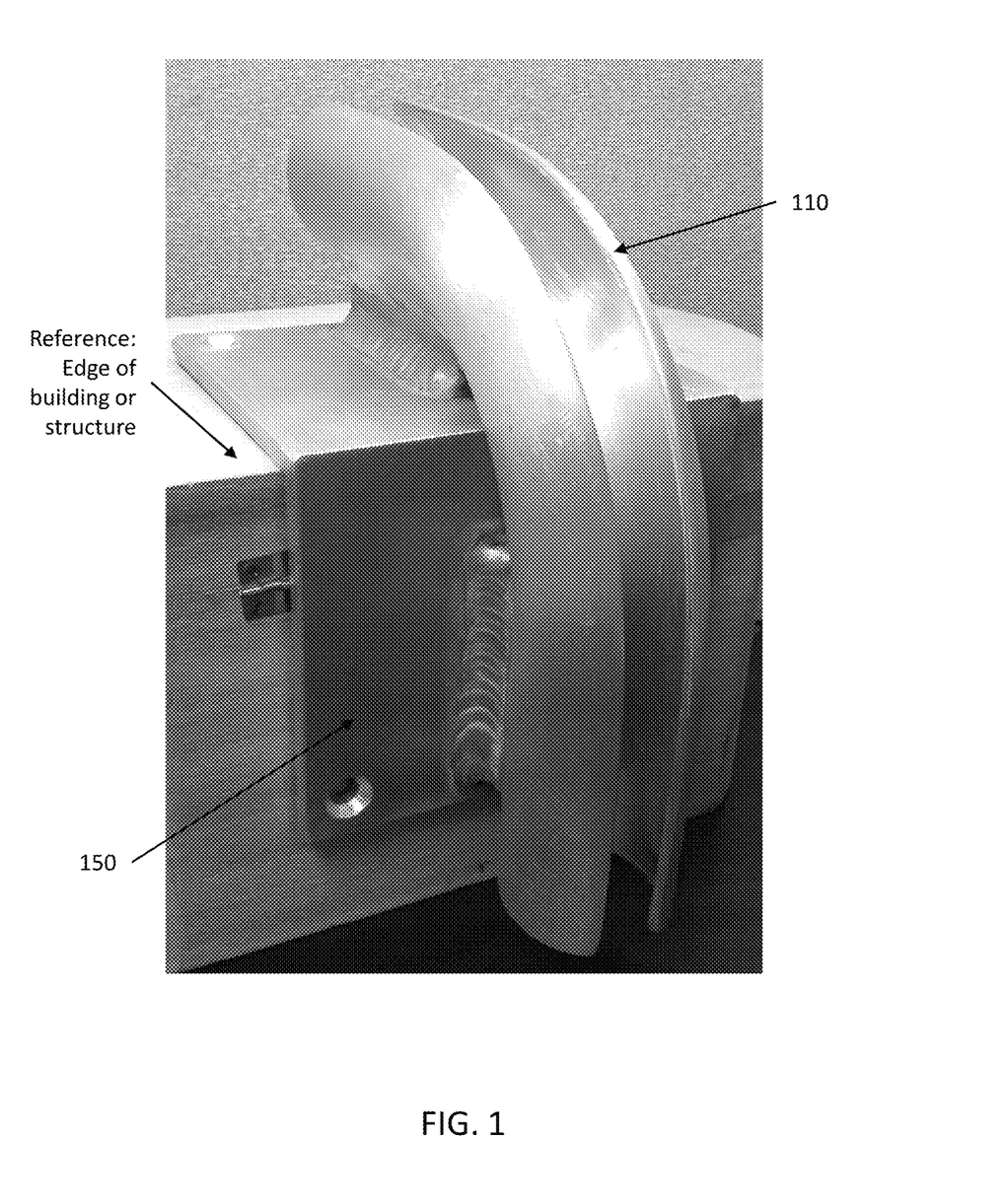
FIG. 1 is a perspective view of an embodiment of the present invention represented as installed on a structure.

Referring to the figures in general, and to FIG. 1 in particular, there is shown an embodiment of a safety apparatus 100. In embodiments, the safety apparatus 100 is configured to be securely attached to a building or other similar structure (shown for reference only in FIG. 1). Embodiments of the safety apparatus 100 may be permanently secured to a building or, alternatively, other embodiments of the safety apparatus 100 may be attached in such a way as to be secure and fixed while installed and in use, but removable when desired.

Figure 2:
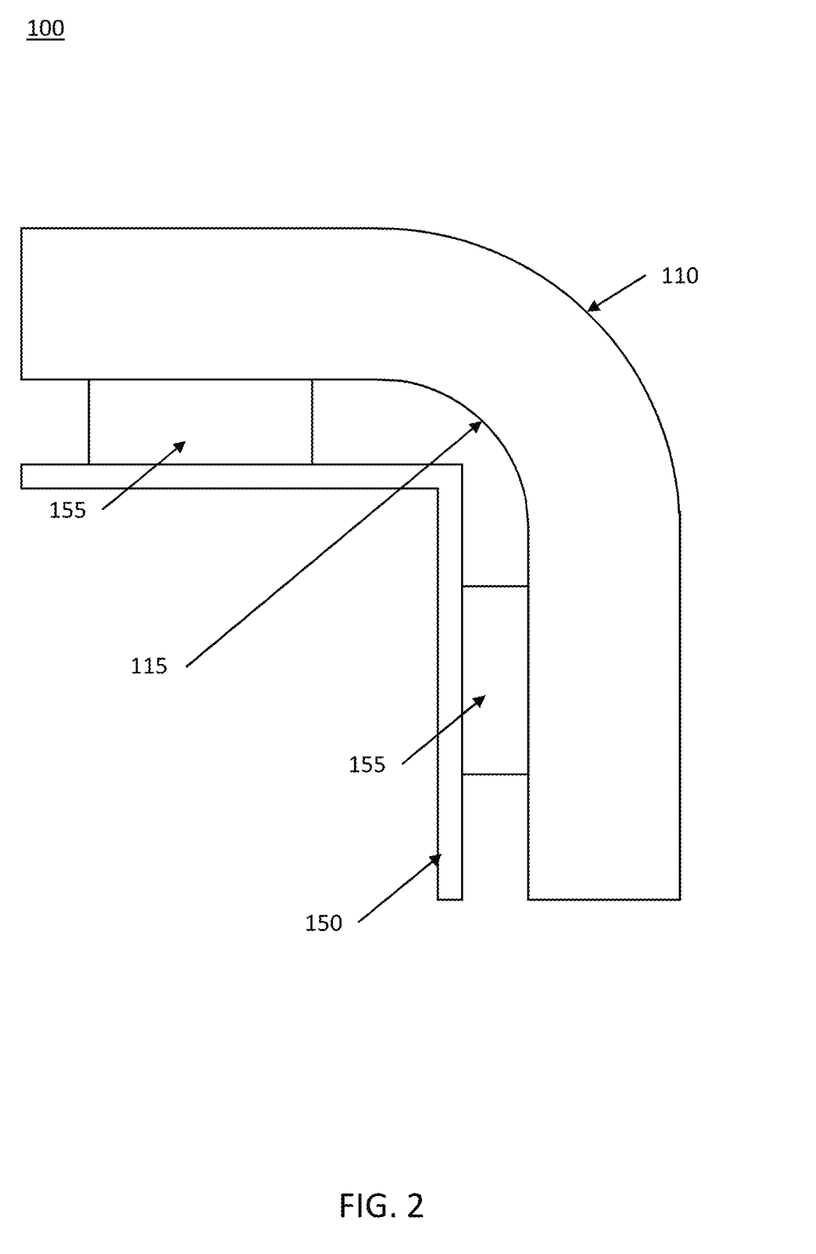
FIG. 2 is a left-side view of an embodiment of the present invention, the right-side view is a mirror image thereof.

A preferred embodiment of the safety apparatus 100 comprises: a cable guide 110 fixedly attached to a one or more attach plate 150. Referring now to FIG. 2, there is shown a left-side view of the safety apparatus, according to an embodiment of the invention. The right-side view would be a mirror image of the left-side view shown in FIG. 2.

Figure 3:
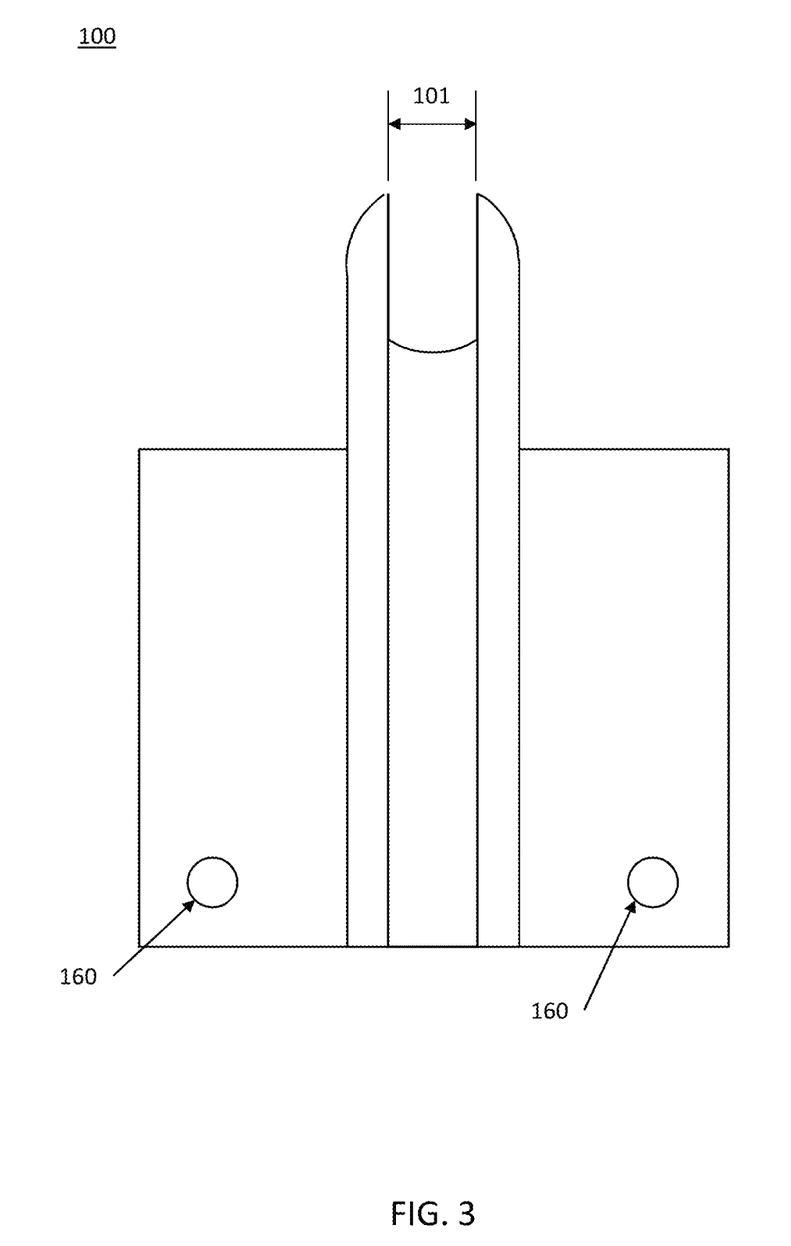
FIG. 3 is a top-side view of an embodiment of the present invention, the front-side view is substantially similar to the top-side view.
Figure 4:
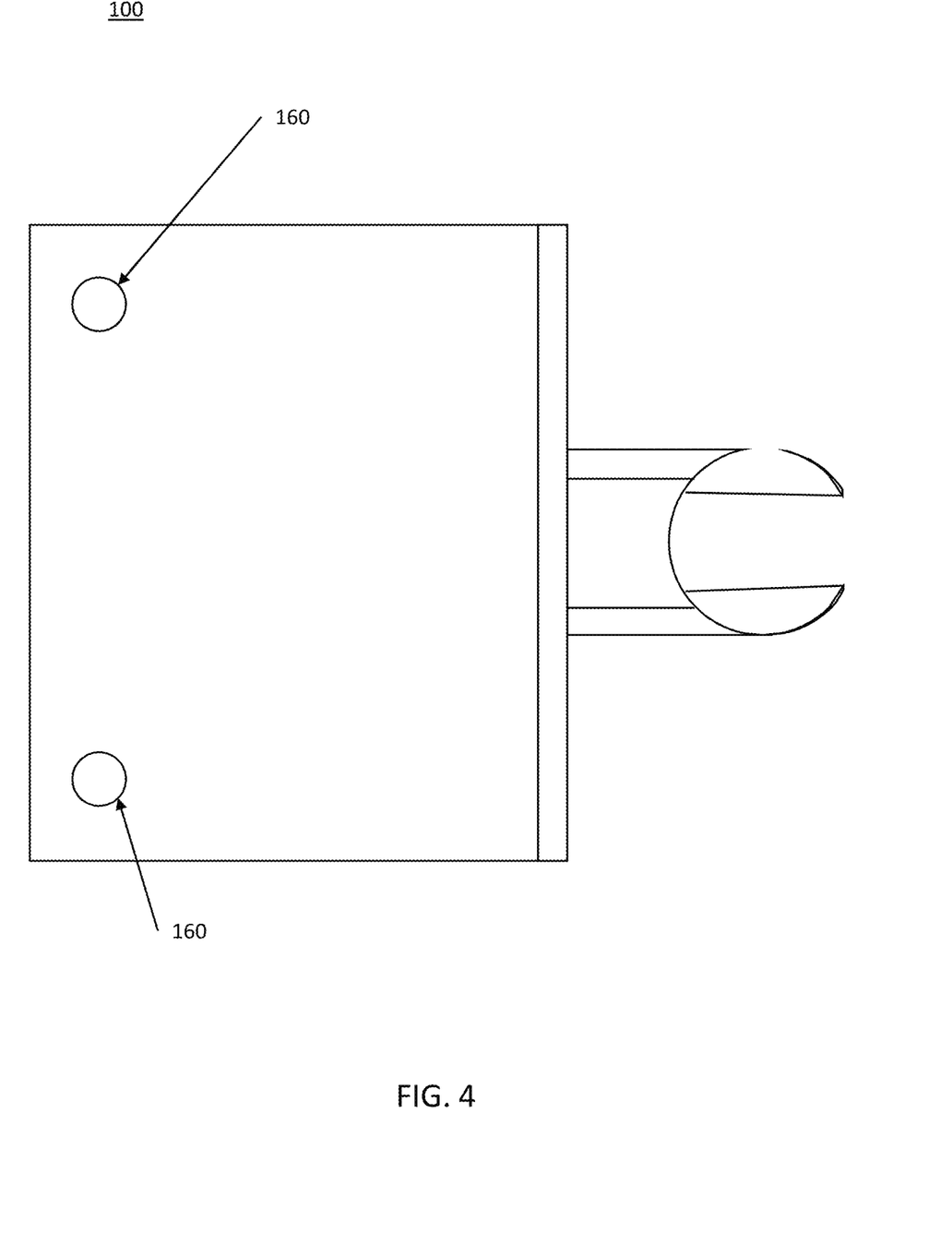
FIG. 4 is a back-side view of an embodiment of the present invention, the bottom-side view is substantially similar to the back-side view.
Figure 5:
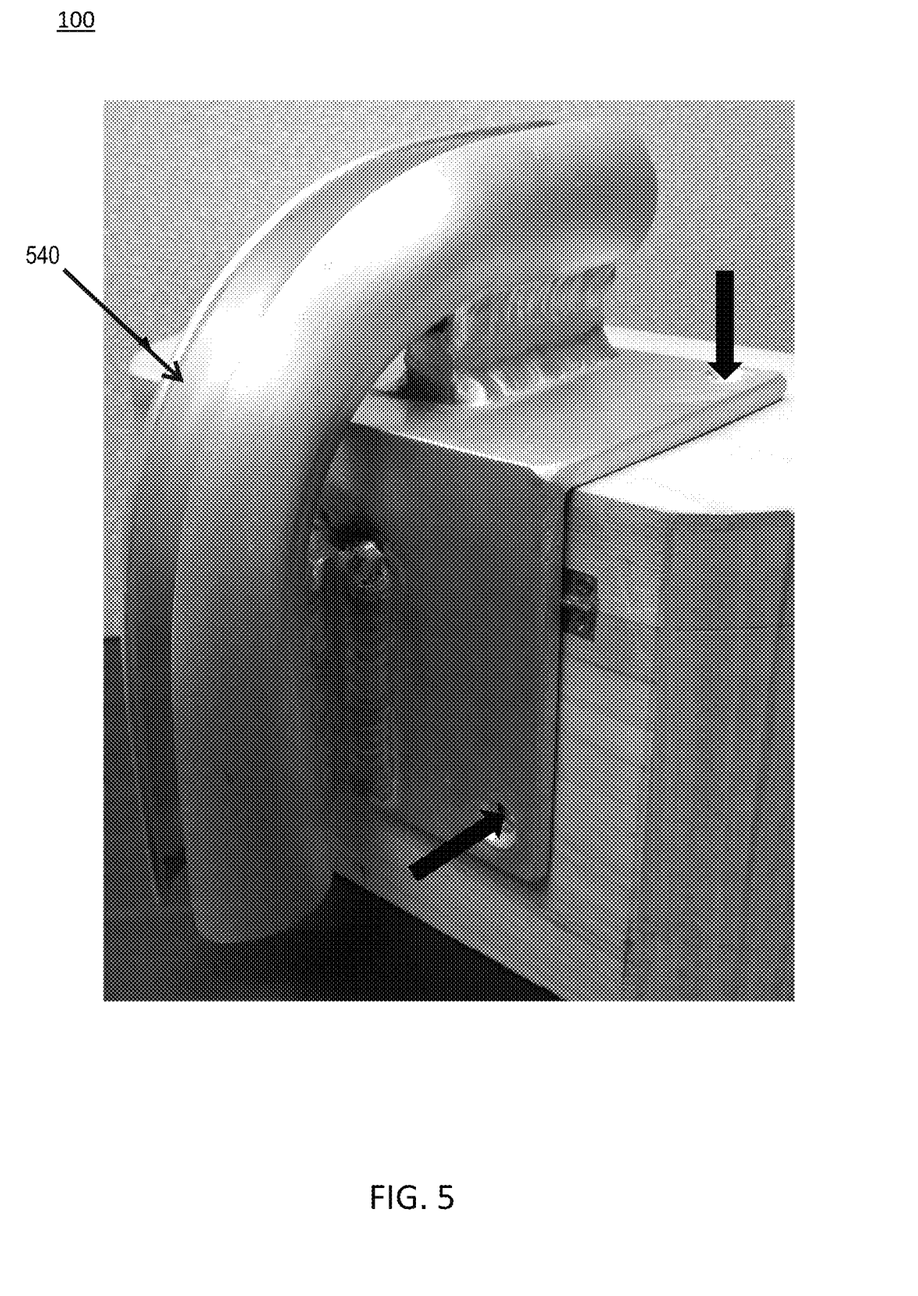
FIG. 5 is a perspective view of an embodiment of the present invention as may be installed on a representative structure.
Figure 6:
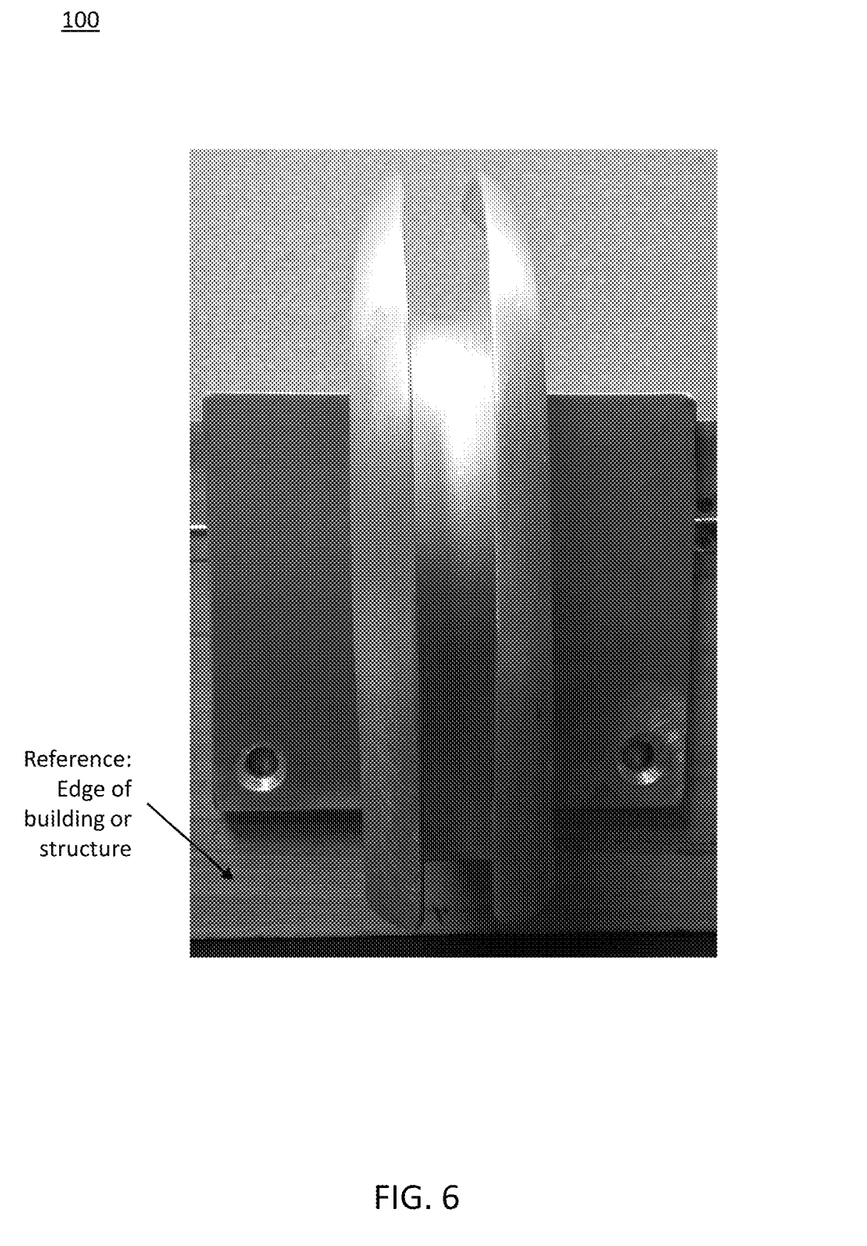
FIG. 6 is a top-side view of an embodiment of the present invention, the front-side view is substantially similar to the top-side view.

In the preferred embodiment, a cable guide 110 has an outer surface and an inner surface, together defining a wall, as well as a proximal first end opening and a distal second end opening at either end of the wall. The wall has a discontinuity running longitudinally from the proximal first end through to the distal second end, thereby forming a slot, groove, or channel, along the length of the cable guide 100. Referring to FIG. 3, the cable guide 110 shown in the figures is disclosed as having a circular cross-section with a slot traversing the length of the cable guide 110, where the width 101 of the slot is less than the overall width of the cable guide 110 cross-section. FIG. 4 shows a back-side view of the safety apparatus 100, while FIG. 5 shows a perspective view of the safety apparatus 100.

The width of the cable guide 110 and slot or channel 540 are configured such that a cable of desired diameter can easily pass through the slot or channel 540 where it is then constrained within the cable guide 110. All exposed edges of the cable guide 110 are smoothed by rounding and/or de-burring to ensure that the cable can slide over the cable guide 110 without damage. The cable guide 110 embodiments shown in the figures are depicted as being bent so that the end openings are substantially at a right angle to each other. It is contemplated to be within the scope of this invention, however, that the cable guide 110 may be bent at any desired angle.

An important aspect of the invention is that the inside bend radius 115 of the cable guide 110 (see FIG. 2), regardless of the cross-sectional shape of the cable guide 110, is chosen to be at least as large as, if not larger than, the minimum bend radius of the cable, rope, or hose to be run through the cable guide 110.

Figure 7:
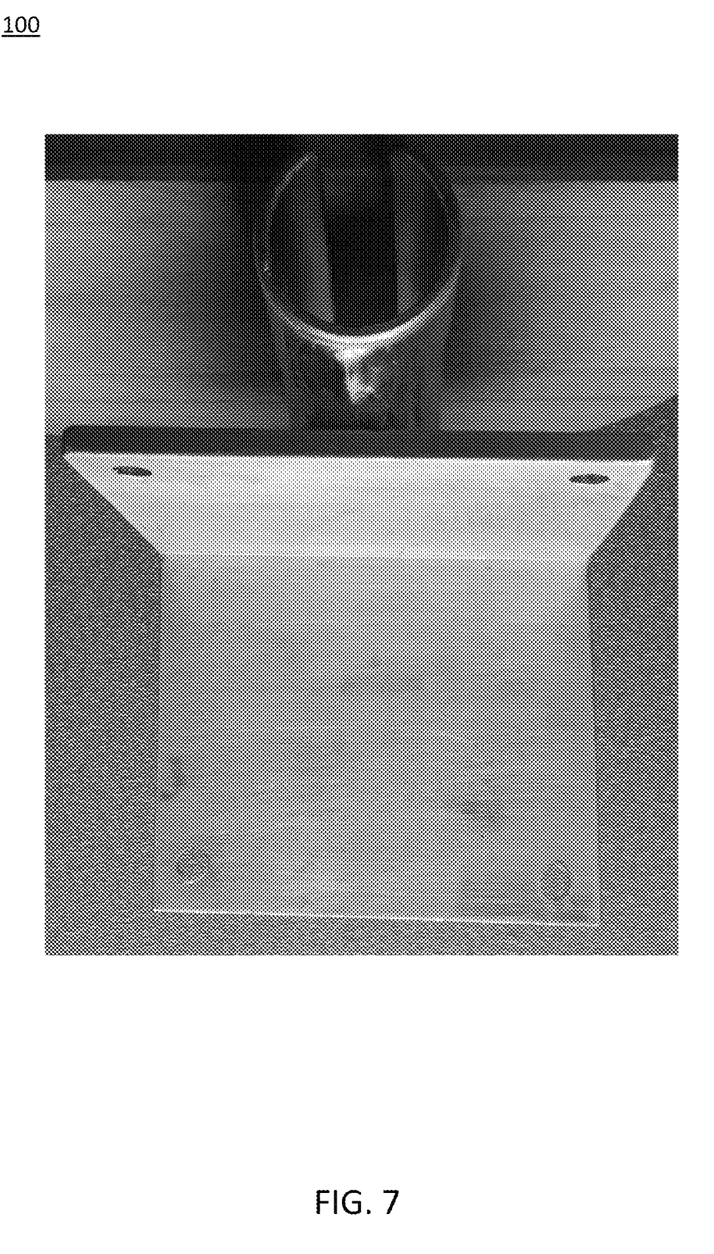
FIG. 7 is a back-side view of an embodiment of the present invention, the bottom-side view is substantially similar to the back-side view.
Figure 8:
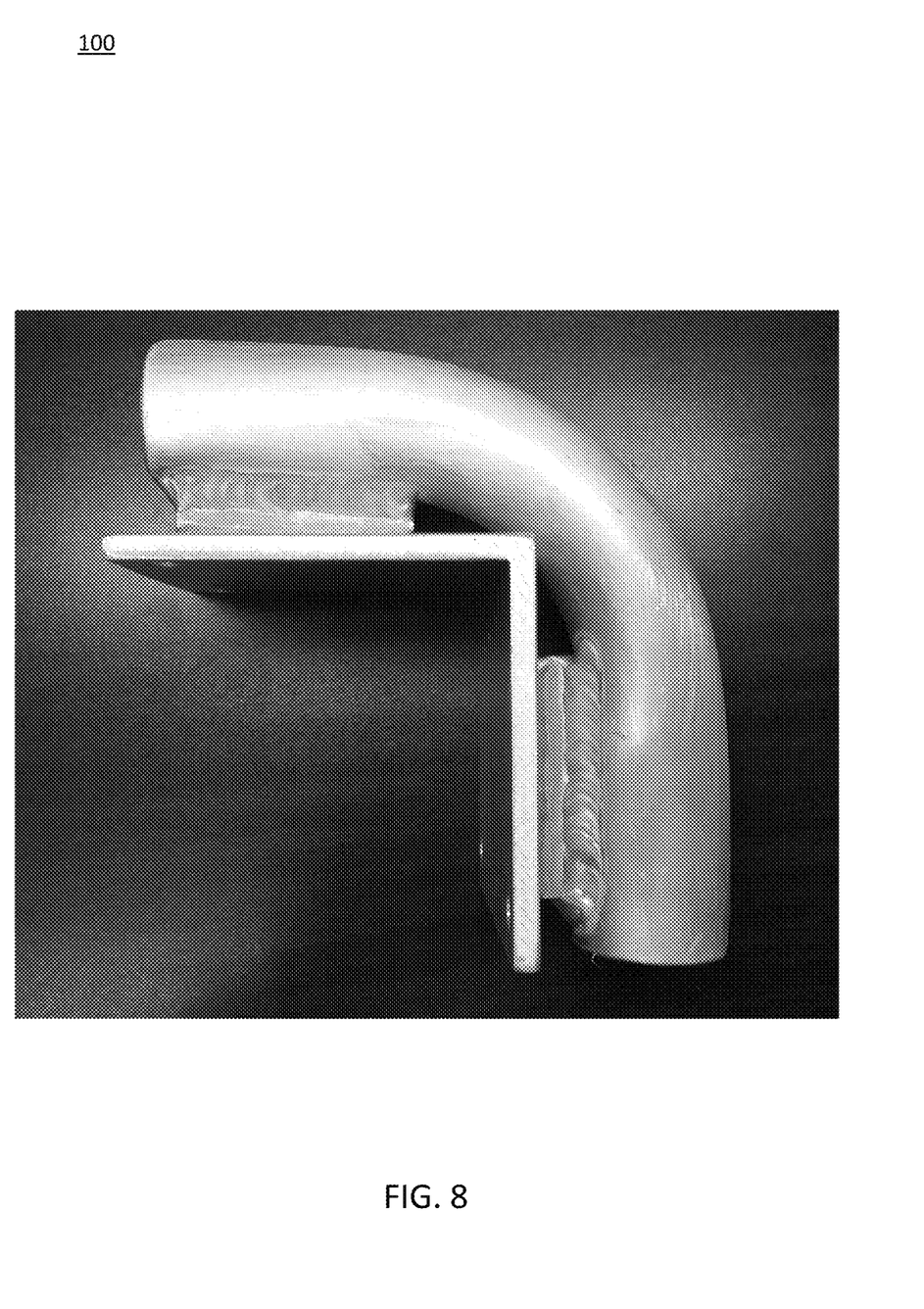
FIG. 8 is a left-side view of an embodiment of the present invention, the right-side view is a mirror image thereof.

In the preferred embodiment, the cable guide 110 is fixedly attached via a one or more attachment 155 to a one or more attach plate 150. The attach plate 150 may occupy one plane or, as shown in the figures, multiple planes. The preferred embodiment comprises a cable guide 110 that is bent at a right angle and fixedly attached, via two attachments 155, to two attach plates, where the two attach plates are fixedly attached to each other at a right angle to form a single-structure attach plate 150, as shown in FIGS. 7 and 8. Each attachment 155 between the attach plate 150 and the cable guide 110 is configured such that the cable guide 110 cannot have any relative translational nor rotational movement in relation to the attach plate 150.

Referring to FIG. 3 there is shown a top-side view of the safety apparatus 100, while FIG. 4 shows a back-side view. The attach plate 150 is further configured with a one or more fixing means 160. Via the one or more fixing means 160, the safety apparatus 100 may be securely attached to a supporting structure, such as, but not limited to, the side of a building. This fixing means 160 may include, by way of example and not limitation, a through-hole configured to accept a screw, bolt, or pin, as shown in FIG. 5. In other embodiments of the invention, the fixing means 160 is configured as an anchor or other protrusion embeddable in a support structure. In yet another embodiment of the invention, the fixing means 160 includes surfaces and structures known in the art enabling the apparatus to be "poured in place," thereby permanently embedded into the supporting structure.

Figure 9:
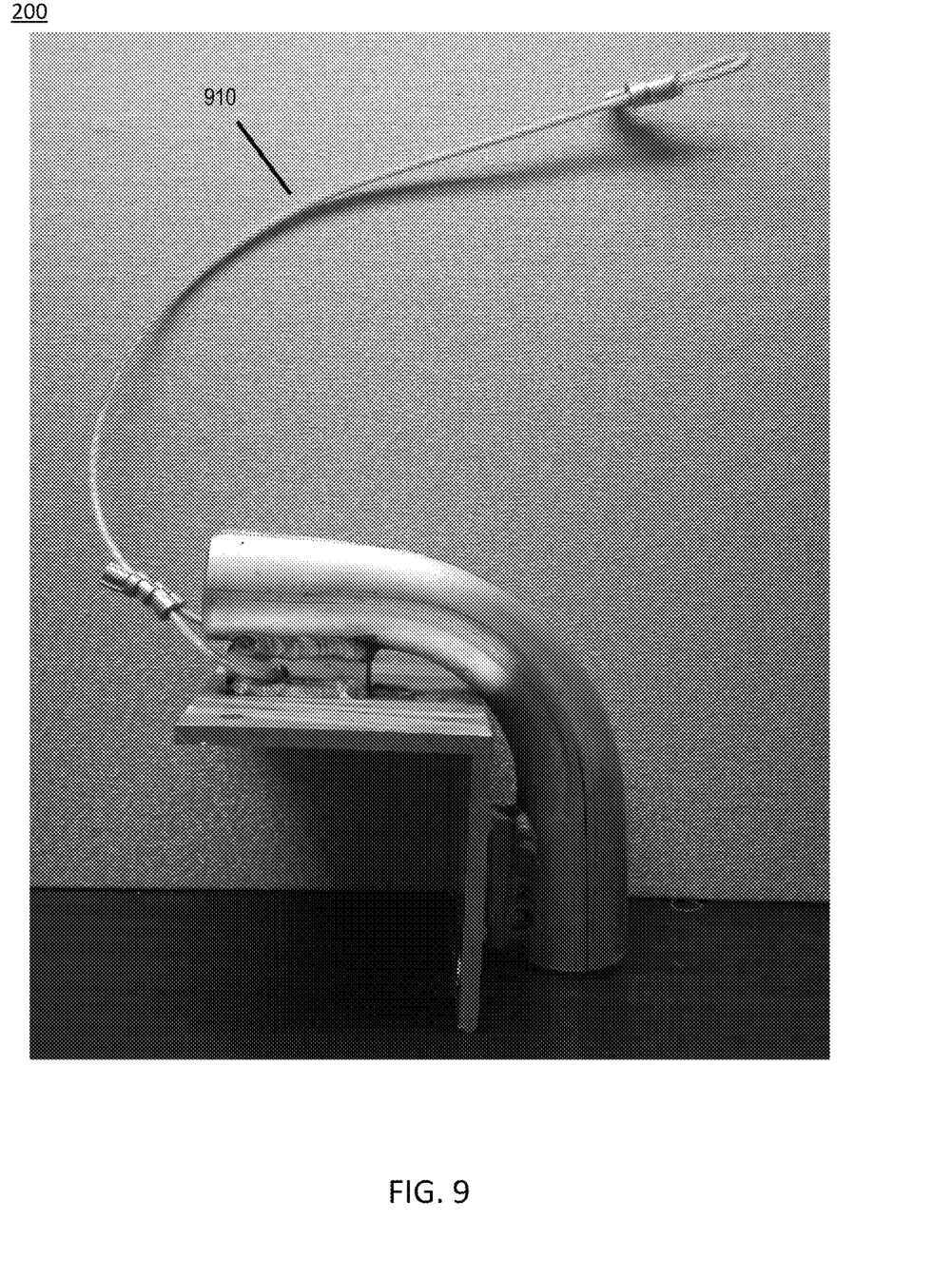
FIG. 9 is a side view of an embodiment of the present invention showing a tethering means.

Referring now to FIG. 9, there is shown an embodiment of the present invention, as described and disclosed above, further comprising a tethering means. This tethering means may be a length of cable 910, or other similar structure, that is fixedly attached to the safety apparatus 100 at one end, and configured to be attached to a structurally secure anchor point other than the safety apparatus 100. This tethering means provides a secondary, or backup, safety feature in the event that the safety apparatus 100 becomes unattached from the supporting structure.

Embodiments of the invention presented may be manufactured out of various types of materials depending upon the contemplated use. By way of example and not limitation, an embodiment of the apparatus intended for use in conjunction with heavy-duty loads, or human beings, may be manufactured out of galvanized steel, high-grade aluminum, or other similarly strong materials. The attach points, welds, and fixing means shall be similarly chosen for strength and durability. In other use-cases, the apparatus 100 may be made from plastics, composites, or other lightweight materials. Embodiments of the present invention may also be injection molded out of PVC (polyvinyl chloride) or other industrial-grade plastics.

It is understood that the variations and options disclosed above with respect to the components of the apparatus embodiments, are also applicable as variations and options with respect to the components for the system embodiments.

In light of the foregoing description, it should be recognized that embodiments in accordance with the present invention can be realized in numerous configurations contemplated to be within the scope and spirit of the claims. Additionally, the description above is intended by way of example only and is not intended to limit the present invention in any way, except as set forth in the appended claims.

The invention claimed is:

1. A safety apparatus configured to be securely attached to a support structure, the safety apparatus comprising:
   at least one attach plate for secure attachment to the support structure, wherein the at least one attach plate comprising: two attach plates fixedly attached to each other at a right angle to form a single-structure attach plate;
   a cable guide configured to constrain a cable, the cable guide fixedly attached to the single-structure attach plate, the cable guide having a wall defined by an outer surface and an inner surface, the wall having a proximal first end opening and a distal second end opening at either end of the wall;
   wherein the wall has a discontinuity running longitudinally from the proximal first end opening through to the distal second end opening, thereby forming a channel along a length of the cable guide;
   wherein all exposed edges of the cable guide are smoothed to ensure that the cable can slide over the cable guide without damage; and
   at least one attachment whereby the cable guide is attached to the at least one attach plate, the at least one attachment configured to prevent any relative lateral movement of the cable guide in relation to the at least one attach plate.

2. The safety apparatus of claim 1 wherein the single-structure attach plate is removably attached to the support structure.

3. The safety apparatus of claim 1 wherein the cable guide comprises a circular cross-section, and wherein a width of the channel is less than an overall width of the circular cross-section.

4. The safety apparatus of claim 1 wherein the cable guide comprises an inside bend radius at least as large as a minimum bend radius of the cable, such that the proximal first end opening and the distal second end opening are bent at an angle relative to each other.

5. The safety apparatus of claim 4 wherein the proximal first end opening and the distal second end opening are bent at a right angle relative to each other.

6. The safety apparatus of claim 1 wherein the single-structure attach plate occupies more than one plane.

7. The safety apparatus of claim 1 wherein the single-structure attach plate is configured with at least one fixing means for secure attachment to the support structure.

8. The safety apparatus of claim 7 wherein the at least one fixing means is a through-hole configured to accept at least one of: a screw, a bolt, and a pin.

9. The safety apparatus of claim 7 wherein the at least one fixing means is an anchor embeddable in the support structure.

10. The safety apparatus of claim 7 wherein the at least one fixing means is an attachment structure permanently embedding the safety apparatus to the support structure.

11. The safety apparatus of claim 1 further comprising a tether fixedly attached to the safety apparatus at a first end and configured to be attached to a structurally secure anchor point at a second end.

12. The safety apparatus of claim 1 wherein the single-structure attach plate and the cable guide are manufactured from galvanized steel.

13. The safety apparatus of claim 1 wherein the single-structure attach plate and the cable guide are manufactured from high-grade aluminum.

14. The safety apparatus of claim 1 wherein the single-structure attach plate and the cable guide are manufactured from plastic.

15. The safety apparatus of claim 14 wherein the single-structure attach plate and the cable guide are injection-molded from industrial-grade plastics.

* * * * *